United States Patent [19]

Kikuzawa et al.

[11] 4,439,059
[45] Mar. 27, 1984

[54] ARTIFICIAL REEF UNIT

[75] Inventors: Kenji Kikuzawa; Shozo Akasaka, both of Moriyama, Japan

[73] Assignee: Asahi Kasei Kogyo Kabushiki Kaisha, Osaka, Japan

[21] Appl. No.: 318,859

[22] Filed: Nov. 6, 1981

Related U.S. Application Data

[63] Continuation-in-part of Ser. No. 166,912, Jul. 8, 1980, abandoned.

[51] Int. Cl.³ .......................... A01K 61/00; E02B 3/00
[52] U.S. Cl. ....................................... 405/25; 428/112
[58] Field of Search ....................... 405/15, 19, 21, 24, 405/25, 32; 428/107, 112, 135, 222, 247, 255

[56] References Cited

U.S. PATENT DOCUMENTS

| | | | |
|---|---|---|---|
| 3,455,112 | 7/1969 | Twele | 405/19 |
| 3,716,998 | 2/1973 | Svendsen et al. | 405/19 |
| 3,755,054 | 8/1973 | Medney | 428/112 |
| 3,887,739 | 6/1975 | Kromrey | 428/112 |

FOREIGN PATENT DOCUMENTS

| | | |
|---|---|---|
| 54-830 | 1/1979 | Japan. |
| 54-24953 | 8/1979 | Japan. |
| 55-8536 | 2/1980 | Japan. |

Primary Examiner—David H. Corbin
Attorney, Agent, or Firm—Birch, Stewart, Kolasch and Birch

[57] ABSTRACT

A novel artificial reef unit comprising a hollow structure with its peripheral framework having oblique lattice pattern windows arranged in specific relationships with fiber-reinforced plastic bands in the framework is found to be durable in the marine environment and extremely effective for gathering fish, shellfish and the like. Representative of the specific relationships include requirements that the peripheral framework of the hollow structure has a total band surface area of 15 to 50% based on the imaginary entire surface area of framework and that the windows in the framework each have an open area of 0.1 to 0.8 m².

11 Claims, 5 Drawing Figures

ARTIFICIAL REEF UNIT

This application is a continuation-in-part of our U.S. application Ser. No. 166,912, filed July 8, 1980, now abandoned.

BACKGROUND OF THE INVENTION

This invention relates to an artificial reef unit which has a high durability in the marine environment and is capable of increasing the productivity and harvestability of fishes.

Recently, attempts have been made by fisheries and propagating and/or cultivating places of fish using artificial reefs. In order to increase the productivity and harvestability of fish, many investigations on suitable structures of artificial reefs have been made from a viewpoint of the ecology of fish.

With respect to the conditions under which fish are attracted to reefs, there can be mentioned the following:

(1) Seaweed and shellfish adhere to the reef and then, small fish come together to take such seaweed and shellfish as bait.

(2) Middle size fish and large fish are attracted to the reef for feeding on the above-mentioned small fish as bait.

(3) Fish are attracted to the reef to use it as shelter from the attack of foreign enemies or as a resting place.

(4) Where a reef of a large-size, three-dimensional structure is present under the tidal currents, the nutrient-rich deep sea water is conveyed to the surface layer of the sea by the action of gushing, rising currents to promote propagation of plankton, thus providing a good bait place, to which fish are attracted; and (5) The tidal current causes the reef to generate a whirlpool effect behind it, and plankton is made to gather under the whirlpool.

Taking into consideration the above-mentioned conditions, various structures of artificial reefs have been devised.

Representative examples of conventionally proposed artificial reefs include those built of scraps or discarded objects such as old ships, old cars, wooden frames, cracked stones, clay pipes, etc. However, with these materials, it is difficult to assemble or construct the reef into a desired shape or structure. In addition, it is not easy to collect necessary quantities of such scraps.

A further proposed approach is an artificial reef comprising a polyhedral concrete block. However, there are such disadvantages that because of its heavy weight this type of artificial reef is difficult to handle and usually needs a boat with a crane mounted thereon for installing it in a desired location.

On the other hand, there are known artificial reefs comprising a plurality of reef units each comprising a hollow cylindrical structure formed by spirally winding elongated fiber glass-reinforced plastics (see Japanese Patent Application Publications Nos. 830/1979 and 24953/1979 and Japanese Utility Model Registration Application Publication No. 8536/1980). Fiber glass-reinforced plastics are small in specific gravity and can be easily shaped into a desired structure and, hence, they are advantageously employable as materials for producing a light-weight, large-size artificial reef. As a result of further investigations on the actual performance of this type of reef by the present inventors, however, it has been revealed that a hollow structure formed by spirally winding elongated fiber glass-reinforced plastic alone, does not sufficiently perform as an excellent artificial reef unit. In other words, unless other specific conditions are satisfied, such a hollow structure formed by spirally winding elongated fiber glass-reinforced plastics will break easily under certain marine conditions, that it cannot be used for a long period of time and, in addition, the fish-gathering effect or fish harvestability is insufficient.

Illustratively stated, in some areas in which an artificial reef is installed, there are strong tidal currents and large changes in direction of tidal currents which cannot be expected by observation from the sea surface and, under some atmospheric conditions, there are generated extremely strong forces of waves. Due to the above phenomena, the artificial reef tends to break. In the case of a large-size artificial reef comprising a hollow structure made of elongated fiber glass-reinforced plastics spirally wound, the hollow structure located at the lowest position of the assembly of hollow structures first undergoes deformation and destruction, followed by sequential destruction of the other hollow structures.

With respect to the fish-gathering effect, it has been found that the open windows alone in the peripheral framework of the hollow structure made of elongated fiber glass-reinforced plastics spirally wound are not always effective for gathering various kinds of fishes. According to the shape and structure of the artificial reef, there are caused changes in the situation, direction and strength of the tidal currents as well as the current volume passing through the hollow structure, thereby affecting the fish-gathering effect. Further, it has been found that the shape and structure of the hollow structure have a great influence on the sheltering effect, restfulness and egg-laying effect for fish.

With a view to eliminating the drawbacks of the conventional artificial reef unit comprising a hollow structure made of elongated fiber glass-reinforced plastics spirally wound and to developing a novel artificial reef unit of such a type structure which is durable in the marine environment and extremely effective for gathering fish, the present inventors have made intensive studies. As a result, it has been found that an artificial reef unit comprising a hollow structure with its peripheral framework having lattice pattern windows arranged in specific relationships is extremely effective for the purposes of the present invention.

SUMMARY OF THE INVENTION

Accordingly, it is one object of the present invention to provide an artificial reef unit which is so durable that it does not undergo corrosion and deterioration of strength.

It is another object of the present invention to provide an artificial reef of the above kind, which is extremely effective for gathering a wide variety of fish.

It is still another object of the present invention to provide an artificial reef unit of the above character, which can fully withstand tidal currents and wave action under drastic marine conditions. is light in weight and easy to handle, and can be freely designed with respect to size.

BRIEF DESCRIPTION OF DRAWINGS

The foregoing and other objects, features and advantages will be apparent to those skilled in the art from the following detailed description taken in connection with the accompanying drawings in which.

DETAILED DESCRIPTION

According to the present invention, there is provided an artificial reef unit comprising a hollow structure having at one end thereof a first opening and at the other end thereof a second opening and having a peripheral framework extending from the circumference of the first opening to the circumference of the second opening, the peripheral framework comprising a plurality of first fiber-reinforced plastic bands wound spirally about an axis of the hollow structure from the first opening to the second opening at an oblique angle with the axis and a plurality of second fiber-reinforced plastic bands wound spirally about the axis in a direction opposite to the first fiber-reinforced plastic bands, thereby forming lattice pattern windows respectively defined by the first fiber-reinforced plastic bands and the second fiber-reinforced plastic bands intersecting therewith, each first fiber-reinforced plastic band and each second fiber-reinforced plastic band being composed of at least two layers of elongated fiber-reinforced plastics each comprising glass-based fibers and a thermohardened resin, thus rendering each of the intersections of the first fiber-reinforced plastic bands and the second fiber-reinforced plastic bands to be a unitary joint formed of at least four layers of fiber-reinforced plastics in which each of the layers constituting the first fiber-reinforced plastic band is laid alternately with each of the layers constituting the second fiber-reinforced plastic band, the fiber-reinforced plastics having a bending strength of 18 to 100 kg/mm$^2$ and a modulus of elasticity of 800 to 7,000 kg/mm$^2$, the hollow structure having a cross-sectional area on a plane perpendicular to said axis of 0.3 to 7 m$^2$, the first fiber-reinforced plastic band and second fiber-reinforced plastic band each having a cross-sectional area of 2 to 15 cm$^2$, the peripheral framework having a total band surface area of 15 to 20% based on the imaginary entire surface area of framework, the windows each having an open area of 0.1 to 0.8 m$^2$.

Figure 1:
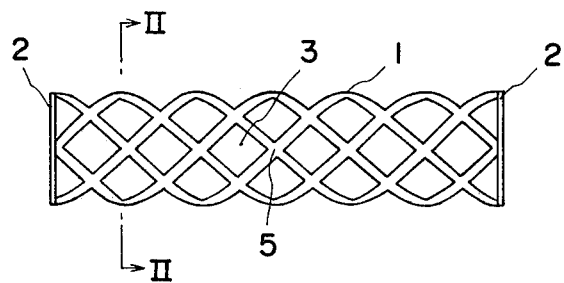
FIG. 1 is a side view of one form of the artificial reef unit embodying the present invention.
Figure 2:
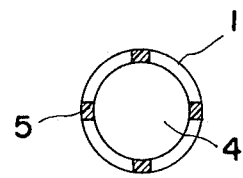
FIG. 2 is a diagrammatic cross-sectional view taken along the line II—II in FIG. 1.

Referring to FIGS. 1 and 2, there are shown a side view of one form of the artificial reef unit embodying the present invention and a cross-sectional view taken along the line II—II in FIG. 1 as viewed from the right, respectively. The artificial reef unit comprises a hollow structure having at one end thereof a first opening 4 and at the other end thereof a second opening (not shown). A peripheral framework extending from the circumference of the first opening 4 to the circumference of the second opening comprises a plurality of first fiber-reinforced plastic bands 1 wound spirally about an axis of the hollow structure from the center of the first opening to the center of the second opening at an oblique angle with the axis and a plurality of second fiber-reinforced plastic bands (not designated by numeral) wound spirally about the axis in a direction opposite to said first fiber-reinforced plastic bands. There are formed lattice pattern open windows 3 respectively defined by the first fiber-reinforced plastic bands 1 and the second fiber-reinforced plastic bands which intersect at joints 5. In FIG. 1, behind the side view of the framework is the same side view as seen there, but the former and the latter completely overlap each other. Numerals 2, and 2 designate circumferential reinforcements which are provided at both ends of the hollow structure and serve also for connecting the unit with adjacent artificial reef units to form a reef assembly.

Figure 3:
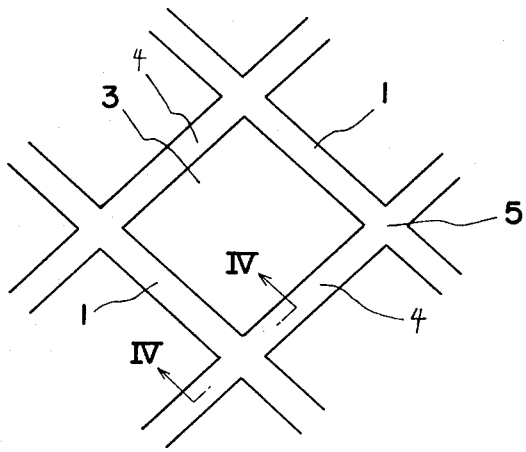
FIG. 3 is an enlarged, partial development view of the artificial reef unit of FIG. 1, showing a window defined by the first fiber-reinforced plastic bands and the second fiber-reinforced plastic bands intersecting therewith.

Referring to FIG. 3, there is shown an enlarged, partial development view of the artificial reef unit of FIG. 1, showing a window 3 defined by the plurality of first fiber-reinforced plastic bands 1, and 1 and the plurality of second-reinforced plastic bands 4, and 4 which intersect at joints 5. Each first fiber-reinforced plastic band and each second fiber-reinforced plastic band are composed of at least two layers of elongated fiber-reinforced plastics each comprising glass-based fibers and a thermohardened resin. The term "glass-based fibers" used herein is intended to mean fiber materials containing as a main component glass fibers and optionally high elasticity fibers such as carbon fibers and aramid fibers incorporated therein. The bending strength of the fiber-reinforced plastic is 18 to 100 kg/mm$^2$, preferably 25 to 95 kg/mm$^2$, more preferably 40 to 90 kg/mm$^2$. The modulus of elasticity of the fiber-reinforced plastic is 800 to 7,000 kg/mm$^2$, preferably 1,000 to 6,000 kg/mm$^2$. When the bending strength and modulus of elasticity of the fiber-reinforced plastic are lower than the range of 18 to 100 kg/mm$^2$ and the range of 800 to 7,000 kg/mm$^2$, respectively, the artificial reef unit comprising a hollow structure made of such fiber-reinforced plastic is insufficient in strength to withstand strong tidal currents and wave action which are expected. On the other hand, even if the bending strength and modulus of elasticity of the fiber-reinforced plastic are higher than these ranges, respectively, there cannot be obtained a correspondingly increased effect in the practical use of the fiber-reinforced plastic. Further, the fiber-reinforced plastic having a high bending strength and modulus of elasticity naturally has less resin content and, hence, the fiber-reinforced plastic is insufficient in durability in the marine environment and tends to easily undergo deterioration. The glass fiber material may be used in the form of a roving, filament, cloth, mat, chopped strand and the like. The glass fiber material in the form of a roving is preferred, from a viewpoint of workability, economics and strength of the artificial reef unit manufactured therefrom. As the thermohardening resin, there may be used an unsaturated polyester resin, an epoxy resin, a vinyl ester resin and the like. It is preferred to employ an unsaturated polyester resin such as POLYMAL 8238 AP (trade name of a product manufactured and sold by Takeda Chemical Industry Co., Ltd. Japan) because such a resin is economical, excellent in characteristics of shaping together with fibers, such as workability and handling, and durable in the marine environment without undergoing deterioration of strength. According to need, a suitable filler and/or a pigment may be incorporated into a thermohardening resin. When an iron oxide such as FeO or $Fe_2O_3$ as the pigment is incorporated into a thermohardened resin, not only the artificial reef unit is caused to have a black color but also the adherence of seaweed and shellfish to the artificial reef unit is promoted. In order to promote adherence of seaweed and shellfish to the reef unit intentionally by the incorporation of an iron oxide into a thermohardening resin, the iron oxide is incorporated in an amount of 0.1 to 5 parts by weight, preferably 0.5 to 2 parts by weight per 100 parts by weight of the thermohardening resin.

The fiber-reinforced plastic band to be used in the present invention may be formed by impregnating a fiber material with a thermohardening resin, followed by curing of the resin. In the present invention, the weight ratio of glass-based fibers to a thermohardening resin may preferably be 30/70 to 70/30, more preferably 40/60 to 60/40. With such a ratio, the artificial reef unit comprising a hollow structure made of the fiber-reinforced plastic band composed of the glass fiber and thermohardened resin is imparted with a sufficient dynamic resistance to strong tidal currents and wave actions.

Figure 4:
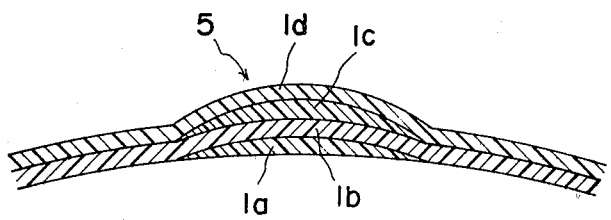
FIG. 4 is an enlarged cross-sectional view taken along the line IV—IV in FIG. 3, showing the structure of the unitary joint of the first fiber-reinforced plastic band and the second fiber-reinforced plastic band according to one embodiment of the present invention.

Referring to FIG. 4, there is shown an enlarged cross-sectional view taken along the line IV—IV of FIG. 3, showing the four-layered structure of the joint 5 of the first fiber-reinforced plastic band and the second fiber-reinforced plastic band in which each of the first and second fiber-reinforced plastic bands is composed of two layers of elongated fiber-reinforced plastics and each of the layers, 1a and 1c, constituting the first fiber-reinforced plastic band is laid alternately with each of the layers, 1b and 1d, constituting the second fiber-reinforced plastic band.

As described above, one feature of the artificial reef unit of the present invention is in that it comprises a hollow structure with its peripheral framework comprising a plurality of first fiber-reinforced plastic bands wound spirally about an axis of the hollow structure at an oblique angle with the axis and a plurality of second fiber-reinforced plastic bands wound spirally about the axis in a direction opposite to said first fiber-reinforced plastic bands. The cross-sectional shape of the hollow structure may be circular, elliptical, triangular, rectangular, pentagonal, hexagonal, . . . or polygonal. The circular shape in cross-section is most preferred because the structure having a circular shape in cross-section has the highest resistance to the external force. The cross-sectional area of the hollow structure is 0.3 to 7 $m^2$, preferably 0.3 to 4 $m^2$. When the cross-sectional area of the hollow structure is less than 0.3 $m^2$, not only the size of the artificial reef unit inevitably becomes small and hence uneconomical, but also the fish-gathering effect is lowered. The artificial reef unit having too large a cross-sectional area of the hollow structure, namely, larger than 7 $m^2$, becomes poor in strength against the external force. Furthermore, with too large a cross-sectional area of the hollow structure, complexity of the structure required for an artificial reef unit is not attained so that the effects of gushing, rising currents and whirlpool effect cannot be exerted, leading to lowering of the fish-gathering effect. As mentioned above, it is necessary for artificial reef units to have a structure which, when they are built up, is caused to provide not only relatively large spaces but also relatively small spaces with appropriate complexity, thereby enabling a sheltering effect to be promoted.

According to the present invention, the diameter of the cross-sectional area of the hollow structure may be either smaller or larger than the length of the hollow structure along the axis.

As is apparent from the aforementioned explanation of the hollow structure, the artificial reef unit of the present invention comprises a hollow structure with its peripheral framework having oblique lattice pattern open windows. Such a hollow structure is formed by a combination of a plurality of first fiber-reinforced plastic bands spirally wound and a plurality of second fiber-reinforced plastic bands spirally wound in a direction opposite to said first fiber-reinforced plastic bands. Illustratively stated, when a plurality of first fiber-reinforced plastic bands wound spirally around a predetermined diameter at a predetermined oblique angle with a winding axis and having plural phases at a predetermined interval are combined with a plurality of second fiber-reinforced plastic bands wound spirally under the same conditions except that they are wound in a direction opposite to the first fiber-reinforced plastic bands, there are formed a peripheral framework having a plurality of oblique lattice pattern open windows. In order for such a peripheral framework to have the appropriate complexity necessary for an artificial reef unit, the first fiber-reinforced plastic bands may be wound at an angle of 45° to 65°, preferably 50° to 60° and the second fiber-reinforced plastic bands are wound in a direction opposite to said first fiber-reinforced plastic bands and, in addition, the first and second fiber-reinforced plastic bands may have 2 to 10 phases, preferably 4 to 6 phases in their respective predetermined directions. The number of phases is equal to the number of intersections of the first and second fiber-reinforced plastic bands for forming oblique lattice pattern windows arranged along the circumferential direction. For example, the number of phases in the embodiment of FIG. 1 is 4. When the number of phases is 1, the artificial reef unit is poor in strength and cannot provide a practical use. On the other hand, when the number of phases is 11 or more, although the artificial reef unit is sufficient in strength, it is poor in passage of tidal currents and uneconomical and, in addition, the fish-gathering effect is lowered.

The cross-sectional area of each fiber-reinforced plastic band is 2 to 15 $cm^2$, preferably 3 to 12 $cm^2$, more preferably 4 to 10 $cm^2$. The first-mentioned range is required for imparting to the artificial reef unit a dynamic resistance to strong tidal currents and wave actions. The width of each fiber-reinforced plastic band may be 5 to 15 cm.

The most important feature of the present invention resides in that the peripheral framework of the hollow structure has a total band surface area of 15 to 50%, preferably 18 to 45%, more preferably 20 to 40% based on the imaginary entire surface area of framework. The term "imaginary entire surface area of framework" used herein is intended to mean an entire surface area of the outer periphery of framework obtained when it is assumed that the open spaces present in the framework are all closed to form a continuous surface on the entire framework. Further, the terms "total band surface area" and "imaginary entire surface area of framework" are areas with respect to the outer periphery of the framework, excluding those with respect to the inner periphery of the framework. In the present invention, the above rate, namely, $$\frac{\text{total band surface area} \times 100}{\text{imaginary entire surface area of framework}} \quad (\%),$$

is called a "stimulus area rate". It is to be noted that the surface areas of circumferential reinforcements which are provided, for example, at both ends of the hollow structure are not taken into account when the "stimulus area rate" is calculated. When the stimulus area rate is more than 50%, the total surface area of fiber-reinforced plastic bands of the framework is large and the open area of the framework is decreased. With such a framework, the decreased open area usually tends to be further reduced easily due to the adherence of shellfish thereto, thereby causing free passage of tidal currents and fish through the artificial reef unit to be prevented. This also leads to lowering of the fish-gathering effect. On the other hand, when the stimulus area rate is less than 15%, not only the strength of the framework of the artificial reef unit is decreased and thus not suitable for a practical use, but also the effects of gushing rising currents and the whirlpool effect cannot be attained, leading to lowering of the fish-gathering effect.

The windows in the framework each have an open area of 0.1 to 0.8 m², preferably 0.2 to 0.7 m². Even if the stimulus area rate is within the range of 15 to 50%, in case the open area of each window is greater than the range of 0.1 to 0.8 m², there cannot be obtained an artificial reef unit having a sufficient strength and capable of exerting an excellent fish-gathering effect that is intended by the present invention. The open area of each window may preferably be smaller than the cross-sectional area of the hollow structure.

Another important feature of the present invention is in that the intersections of the first fiber-reinforced plastic bands spirally wound and the second fiber-reinforced plastic bands spirally wound in a direction opposite to said first fiber-reinforced plastic bands are all firmly fixed and connected to form unitary joints, thereby providing an artificial reef unit having a high strength. Such a fixed connection at the intersections is attained by the thermohardened resin which is one component of the fiber-reinforced plastic band. Since each first fiber reinforced plastic band and each second fiber-reinforced plastic band are composed of at least two layers of elongated fiber-reinforced plastics each comprising glass-based fibers and a thermohardened resin, the intersection is formed of at least four layers (preferably 10 to 16 layers) of fiber-reinforced plastics, in which each of the layers constituting the first fiber-reinforced plastic band is laid alternately with each of the layers constituting the second fiber-reinforced plastic band. Each band and the intersections thereof are so constructed that the artificial reef unit of the present invention has extremely high resistance to strong tidal currents and wave action.

In the artificial reef unit of the present invention, as mentioned before, circumferential reinforcements (see FIG. 1 at 2) may be provided at both ends of the hollow structure. In assembling or building up the units, the circumferential reinforcements serve also for connecting the unit with adjacent reef units, thereby forming an artificial reef assembly. Such circumferential reinforcements may also be provided intermediate the both ends of the hollow structure at an interval of 2 to 3 m. The circumferential reinforcements may be easily formed by winding a fiber-reinforced plastic band at a right angle with the axis of the hollow structure, independently of the spiral winding of fiber-reinforced plastic bands.

In practice, the volume of the hollow structure of the artificial reef unit may be in the range of 1 to 100 m³.

Figure 5:
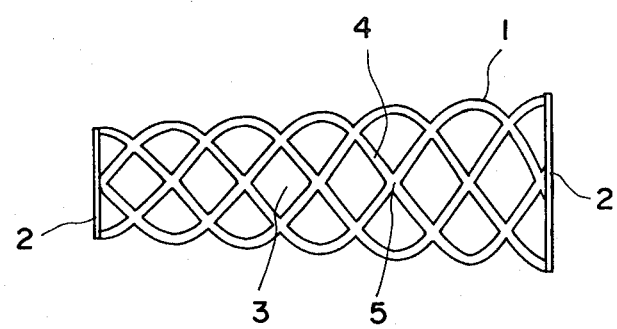
FIG. 5 is a side view of another form of the artificial reef unit embodying the present invention.

As described, the artificial reef unit of the present invention is light in weight but usually large in size. Therefore, in transportation of the present artificial reef units, various difficulties are encountered. As one measure for solving such a problem, a hollow structure of the present artificial reef unit is devised to have a reducing diameter from one end to the other end as is illustrated in FIG. 5. A plurality of the so devised hollow structures may be coaxially laid one upon the other by inserting a hollow structure at its end having a reduced diameter into another hollow structure at its end having a non-reduced diameter, and so on, whereby a plurality of the hollow structures of artificial reef units can be transported in a compact form. Alternatively, with respect to hollow structures having their respective diameters unchanged from end to end, it is advantageously adopted to provide hollow structures with their diameters varied and lay them coaxially with one another utilizing the differences in diameter, so that a plurality of reef units can be transported in a compactly accomodated form.

For producing an artificial reef unit of the present invention, according to a customary filament winding method, a roving of glass-based fibers impregnated with a thermohardening resin is wound around a mandrel having a circular or polygonal cross-section in such a spiral manner that the roving passes the same locus every two to several reciprocations. After curing of the thermohardening resin, the mandrel is released to obtain a desired hollow structure. In practicing the production, the denier of glass fiber, number of strands of glass fibers, number of layers, kind of thermohardening resin, weight ratio of a fiber material to a thermohardening resin, curing temperatures and curing time are required to be preliminarily set through experiments so that the bending strength and modulus of elasticity of the resulting fiber-reinforced plastic and the cross-sectional area of the fiber-reinforced plastic band are within the ranges defined in the present invention. In the present invention, the bending strength and modulus of elasticity are measured according to ASTM D790, method 1 in Table 1. Further, the respective ranges with respect to diameter of a hollow structure, angle at which the fiber-reinforced plastic band is spirally wound, number of phases and width of circumferential reinforcements are required to be preliminarily set by calculation so that the resulting stimulus area rate and the open area of each window are within the ranges defined in the present invention.

The present invention will now be described in detail with reference to the following Examples that by no means limit the scope of the invention.

EXAMPLES 1 TO 4 AND COMPARATIVE EXAMPLES 1 TO 5

40 Rovings of #1064 (trade name of glass fibers produced and sold by PPG, U.S.A.) 2000 Tex were impregnated with a resin liquid having the following composition:

| | |
|---|---|
| POLYMAL 8238AP (trade name of an unsaturated polyester resin produced and sold by Takeda | 100 parts by weight |

| -continued | |
|---|---|
| Chemical Industry Co., Ltd., Japan) | |
| Methyl ethyl ketone peroxide (curing agent) | 1 part by weight |
| Ferric oxide (pigment) | 1 part by weight |

The impregnated rovings were squeezed by passing them between rolls and then were wound around a cylindrical mandrel of a filament winding machine. The winding conditions of Examples 1 to 4 and Comparative Examples 1 to 5 are shown in Table 1.

the both ends of each of the units. After curing of the resin, the tied portions were fixedly attached to each other to connect all the nine units firmly, thus providing a three-step artificial reef. To the units positioned on both sides of the bottom step of the artificial reef is deposited concrete as a weight so that the reef is prevented from falling down and sliding by tidal currents and wave actions. Five to nine assemblies of artificial reefs thus prepared in each of Examples 1 to 4 and Comparative Examples 1 to 5 were installed on the about 22 to 40 m-depth sea bottom. After 6 months, the

TABLE 1

| Winding conditions | Example 1 | Comparative Example 1 | Comparative Example 2 | Comparative Example 3 | Example 2 | Example 3 | Comparative Example 4 | Example 4 | Comparative Example 5 |
|---|---|---|---|---|---|---|---|---|---|
| Length of the unit, m | 7 | 7 | 7 | 5 | 5 | 7 | 5 | 5 | 5 |
| Diameter of the unit (diameter of mandrel), m | 1.6 | 1.65 | 2 | 1 | 1 | 1 | 0.6 | 2 | 2 |
| Angle at which the impregnated rovings were spirally wound, (°) | 54.2 | 54.2 | 54.2 | 60.0 | 60.0 | 54.2 | 54.2 | 54.2 | 54.2 |
| Number of phases | 5 | 3 | 4 | 5 | 4 | 4 | 5 | 4 | 4 |
| Number of layers | 6 | 6 | 5 | 7 | 6 | 6 | 4 | 5 | 4 |
| Number of portions at which circumferential reinforcements were provided | 4 | 4 | 4 | 3 | 3 | 4 | 3 | 3 | 3 |

Note
(1) Figure "3" means that circumferential reinforcements of six layers were provided on both the inner and outer peripheral frameworks at both ends of the unit and at one portion intermediate the both ends.
(2) Figure "4" means that circumferential reinforcements of six layers were provided on both the inner and outer peripheral frameworks at both ends of the unit and at two portions intermediate the both ends.

About 1 hour after the winding of the impregnated rovings around the mandrel, the thermohardening resin was cured. The artificial reef unit which was shaped by the complete curing of the resin was taken by releasing the mandrel through compression thereof.

The characteristics of the resulting artificial reef units are shown in Table 2. As the values of glass fiber content of fiber-reinforced plastic band, bending strength, modulus of elasticity, cross-sectional area of fiber-reinforced plastic band, width of fiber-reinforced plastic band, open area of one window, there are shown respective average values obtained by measurements at five different portions.

artificial reefs were investigated by diving. On the entire framework composed of fiber-reinforced plastic bands, there was observed propagation of shellfishes such as barnacle.

With respect to the fish-gathering effect, the following results were obtained.

TABLE 3

| Example No. | Fish-gathering effect |
|---|---|
| Example 1 | excellent |
| Examples 2, 3 and 4 | good |
| Comparative Examples 1, 2 and 5 | fairly good |
| Comparative Examples 3 and 4 | poor |

TABLE 2

| | Example 1 | Comparative Example 1 | Comparative Example 2 | Comparative Example 3 | Example 2 | Example 3 | Comparative Example 4 | Example 4 | Comparative Example 5 |
|---|---|---|---|---|---|---|---|---|---|
| Glass fiber content, % | 54.0 | 53.6 | 52.4 | 58.0 | 59.0 | 55.0 | 51.3 | 51.2 | 56.4 |
| Bending strength, kg/mm$^2$ | 87 | 86 | 86 | 88 | 86 | 89 | 82 | 86 | 85 |
| Modulus of elasticity, Kg/mm$^2$ | 3,500 | 3,450 | 3,600 | 3,700 | 3,650 | 3,700 | 3,400 | 3,650 | 3,700 |
| Cross-sectional area of fiber-reinforced plastic band, cm$^2$ | 6.3 | 6.2 | 7.2 | 5.4 | 5.6 | 6.2 | 4.8 | 7.3 | 7.3 |
| Width of fiber-reinforced plastic band, cm | 9.2 | 9.2 | 6.1 | 12.6 | 8.9 | 9.0 | 5.4 | 8.2 | 4.7 |
| Open area of one window, m$^2$ | 0.26 | 0.89 | 0.78 | 0.04 | 0.11 | 0.14 | 0.03 | 0.74 | 0.8 |
| Stimulus area rate, % | 28.8 | 17.4 | 12.8 | 64.1 | 40.2 | 35.3 | 43.0 | 17.1 | 10.0 |
| Volume of the unit, m$^3$ | 14.1 | 15.0 | 22.0 | 3.9 | 3.9 | 5.5 | 1.4 | 15.7 | 15.7 |
| Cross-sectional area of hollow structure, m$^2$ | 2.0 | 2.1 | 3.1 | 0.8 | 0.8 | 0.8 | 0.3 | 3.1 | 3.1 |

In each of Examples 1 to 4 and Comparative Examples 1 to 5 there were prepared nine artificial reef units. In each of Examples and Comparative Examples, four units were arranged in parallel. On the four units were arranged three units, on which were then arranged two units. The nine units thus piled up were connected by means of 10 rovings of #712 (trade name of glass fibers produced and sold by PPG, U.S.A.) 8800 Tex impregnated with the resin liquid of the aforementioned composition in such a manner that the rovings were tied round the circumferential reinforcements provided at In Comparative Examples 2 and 5 in which the stimulus area rate is less than 15% and in Comparative Example 1 in which the open area of one window in the peripheral framework is more than 0.8 m$^2$, not only the visual stimulation against fishes is too small, but also a sheltering effect is very small. In addition, the effects of gushing rising currents and whirlpool are low and, hence, there is not exerted so excellent fish-gathering effect. On the other hand, in Comparative Example 3 in which the stimulus area rate is more than 50% and in Comparative Examples 3 and 4 in which the open area of one window is less than 0.1 m², the open areas of window are much reduced due to the propagation of shellfishes and, hence, it becomes difficult for fishes to pass through the peripheral framework, causing the fish-gathering effect to be extremely lowered.

The invention being thus described, it will be obvious that the same may be varied in many ways. Such variations are not to be regarded as a departure from the spirit and scope of the present invention, and all such modifications would be obvious to one skilled in the art are intended to be included within the scope of the following claims.

What is claimed is:

1. An artificial reef unit comprising a hollow structure formed by spirally winding elongated fiber-reinforced plastics and having at one end thereof a first opening and at the other end thereof a second opening and having a peripheral framework extending from the circumference of said first opening to the circumference of said second opening, said peripheral framework comprising a plurality of first fiber-reinforced plastic bands wound spirally about an axis of the hollow structure from said first opening to said second opening at an oblique angle with the axis to have a plurality of phases of the number corresponding to the number of the first fiber-reinforced plastic bands and a plurality of second fiber-reinforced plastic bands wound spirally about the axis in a direction opposite to said first fiber-reinforced plastic bands to have a plurality of phases of the number corresponding to the number of the second fiber-reinforced plastic bands, thereby forming lattice pattern windows respectively defined by said first fiber-reinforced plastic bands and said second fiber-reinforced plastic bands intersecting therewith, each first fiber-reinforced plastic band and each second fiber-reinforced plastic band being composed of at least two layers of elongated fiber-reinforced plastics each comprising glass-based fibers and a thermohardened resin, thus rendering each of the intersections of said first fiber-reinforced plastic bands and said second fiber-reinforced plastic bands to be a unitary joint formed of at least four layers of fiber-reinforced plastics in which each of the layers constituting said first fiber-reinforced plastic band is laid alternately with each of the layers constituting said second fiber-reinforced plastic band, said fiber-reinforced plastics having a bending strength of 18 to 100 kg/mm² and a modulus of elasticity of 800 to 7,000 kg/mm², said hollow structure having a cross-sectional area on a plane perpendicular to said axis of 0.3 to 7 m², said first fiber-reinforced plastic band and second fiber-reinforced plastic band each having a cross-sectional area of 2 to 15 cm², said peripheral framework having a total band surface area of 15 to 50% based on the imaginary entire surface area of framework, said windows each having an open area of 0.1 to 0.8 m².

2. An artificial reef unit according to claim 1, which further comprises circumferential reinforcements provided at least on both ends of said hollow structure.

3. An artificial reef unit according to claim 1, wherein said glass-based fibers and said thermohardened resin are present in the fiber-reinforced fibers at a weight ratio of 30/70 to 70/30.

4. An artificial reef unit according to claim 1, wherein said hollow structure has a volume of 1 to 100 m³.

5. An artificial reef unit according to claim 1, wherein said plurality of first fiber-reinforced plastic bands and said plurality of second fiber-reinforced plastic bands have 2 to 10 phases in their respective predetermined directions.

6. An artificial reef unit according to claim 1, wherein said plurality of first fiber-reinforced plastic bands are wound spirally about the axis of the hollow structure at an angle of 45° to 65° with the axis.

7. An artificial reef unit according to claim 1, wherein said first and second fiber-reinforced plastic bands each have a width of 5 to 15 cm.

8. An artificial reef unit according to claim 1, wherein said hollow structure has a reducing diameter from one end to the other end.

9. An artificial reef unit according to claim 1, wherein said hollow structure has a cross-sectional area larger than the open area of each window in the peripheral framework.

10. An artificial reef unit according to claim 1, wherein said thermohardened resin has an iron oxide incorporated therein.

11. An artificial reef unit according to claim 1, wherein said hollow structure has a circular cross-section.

* * * * *